United States Patent
Liu et al.

(10) Patent No.: US 9,922,428 B2
(45) Date of Patent: Mar. 20, 2018

(54) VIBRATION IMAGE ACQUISITION AND PROCESSING

(71) Applicant: Crystal Instruments Corporation, Santa Clara, CA (US)

(72) Inventors: Yihao Liu, Hangzhou (CN); Hongjian Gao, Linhai (CN); James Zhuge, Palo Alto, CA (US); Weijie Zhao, Los Gatos, CA (US)

(73) Assignee: CRYSTAL INSTRUMENTS CORPORATION, Santa Clara, CA (US)

( * ) Notice: Subject to any disclaimer, the term of this patent is extended or adjusted under 35 U.S.C. 154(b) by 46 days.

(21) Appl. No.: 15/241,547

(22) Filed: Aug. 19, 2016

(65) Prior Publication Data

US 2018/0053310 A1 Feb. 22, 2018

(51) Int. Cl.

| | |
|---|---|
| G06K 7/00 | (2006.01) |
| H04N 5/228 | (2006.01) |
| G01H 17/00 | (2006.01) |
| B06B 3/00 | (2006.01) |
| G01H 1/00 | (2006.01) |
| G06T 7/20 | (2017.01) |
| H04N 13/02 | (2006.01) |
| G01N 29/34 | (2006.01) |

(52) U.S. Cl.
CPC ............ *G06T 7/2093* (2013.01); *G01N 29/34* (2013.01); *H04N 13/0239* (2013.01); *H04N 13/0296* (2013.01); *G06T 2207/10021* (2013.01)

(58) Field of Classification Search
CPC ......... G06T 7/2093; G06T 2207/10021; G06T 7/0075; G06T 2207/10012; G06T 7/0022; G01N 29/34; H04N 13/0296; H04N 13/0239; H04N 2013/0081; G06K 9/00214
USPC ............ 382/151, 154, 173, 312; 348/208.99, 348/373, 374, 208.4, 208.1, 208.2, 208.6, 348/169, 208.11, 208.7, 335; 73/570, 73/662, 663, 668, 664, 667, 579, 582, 73/577
See application file for complete search history.

(56) References Cited

U.S. PATENT DOCUMENTS 5,644,087 A * 7/1997 Liu ....................... G01M 7/045
   73/432.1
5,969,256 A * 10/1999 Hobbs ..................... G01M 7/06
   73/662

(Continued)

*Primary Examiner* — Sheela C Chawan
(74) *Attorney, Agent, or Firm* — Thomas Schneck

(57) ABSTRACT

A shaker test apparatus is provided along with a method of collecting and processing images, wherein a shaker table is driving the device under test by a vibration controller at a known vibration frequency and period, wherein a device under test obtains a steady-state vibration characteristic of that excitation frequency when mounted on the shaker table. While the device under test is being excited, a trigger signal controller triggers a camera to capture a series of still image frames at a regular sampling frequency that is less than the vibration frequency (under-sampling), and a timer associated with the camera records a timestamp of an image capture time for each image frame. A computer processor uses the timestamps to remap the order of the image frames, shifting each frame's capture time backwards by a specified multiple of vibration periods in order to correctly represent a single vibration period beginning with an earliest captured image.

11 Claims, 4 Drawing Sheets

(56) References Cited

U.S. PATENT DOCUMENTS

| | | |
|---|---|---|
| 7,855,731 B2 | 12/2010 | Yu |
| 7,886,716 B1 | 2/2011 | Arai et al. |
| 7,932,926 B2 | 4/2011 | Tomita et al. |
| 8,072,500 B2 | 12/2011 | Gau et al. |
| 8,760,526 B2 | 6/2014 | Kotani |
| 8,805,075 B2 | 8/2014 | Goodman et al. |
| 8,885,055 B2 | 11/2014 | Tanaka et al. |
| 8,896,713 B2 | 11/2014 | Corey et al. |
| 8,964,049 B2 | 2/2015 | Shirono |
| 8,971,696 B2 | 3/2015 | Wakamatsu |
| 9,019,568 B2 | 4/2015 | Madhani et al. |
| 9,030,566 B2 | 5/2015 | Miyasako |
| 9,217,797 B2 | 12/2015 | Tulett et al. |
| 9,224,045 B2 | 12/2015 | Land et al. |
| 9,274,135 B2 | 3/2016 | Kilpatrick et al. |
| 9,317,044 B2 * | 4/2016 | Zhuge .................... G05D 19/02 |
| 9,377,375 B2 * | 6/2016 | Alderson .............. G01M 7/022 |
| 2014/0313354 A1 | 10/2014 | Kusanagi |
| 2015/0182122 A1 | 7/2015 | Bamber et al. |
| 2015/0365598 A1 | 12/2015 | Tanaka et al. |

* cited by examiner

VIBRATION IMAGE ACQUISITION AND PROCESSING

TECHNICAL FIELD

The present invention relates to vision-based vibration testing of devices under test by means of a shaker table or similar vibration test equipment, and in particular relates to the acquisition and processing of images of the device under test while undergoing such vibration testing.

BACKGROUND ART

In vibration testing, including modal analysis, a large amount of hardware equipment would be required for the large scale model testing when traditional vibration sensors are used. Further time and efforts of a group of engineers would be significant too in order to carry out the tests over hundreds of measurement points on the device under test.

Since a few decades ago, DIC technology emerged with the development of the high speed camera. In recent decades, the advances of 3D stereo camera and associated DIC methods make it possible to measure the 3-dimensional vibration deformation of the device under test. This technology results in the full field measurement of the device under test, and which also can be done with significant less time and effort.

In a conventional DIC based vibration testing system, a shaker table is used to drive the device under test, while one or more cameras image the device under test being excited. Because there is typically no synchronization between the vibration of the shaker table and the exposure trigger for the cameras, expensive high-speed cameras need to be used to ensure an image sampling rate that is at least twice the vibration frequency of the device under test. This is the normal sampling mode for image acquisition in such systems.

As a possible cheaper alternative, one might contemplate use of low-cost, but also low-speed, cameras with some kind of under-sampling technique by means of synchronized triggering of such cameras. However, the existence of jitter (time deviations) in either the trigger signal itself, or more commonly in the cameras' response, severely limits the potential accuracy of such a scheme. Any random deviations in the cameras' frame capture times will result in errors during subsequent processing to reconstruct a correct sequence of image frames.

SUMMARY DISCLOSURE

A shaker test apparatus and method acquires and processes a series of images of a device under test on a shaker table in order to capture and analyze the vibration of the device under test when excited at a known frequency. In particular, timestamping of the captured images is used to facilitate under-sampling and then remapping of the sequence of images so that a low trigger rate for one or more cameras can be employed even in the presence of a much higher excitation frequency of the vibration.

The shaker test apparatus comprises a shaker table with a vibration controller, one or more cameras (any of which could be stereo cameras) with a trigger signal controller and timer, and a processing computer. The vibration controller is connected to the shaker table so as to drive the shake table at a known vibration frequency, and period. When a device under test is mounted on the shaker table and driven, the device under test will settle to a steady-state vibration characteristic that can be captured by a series of images. The camera(s) is directed toward the device under test so as to image the device under test that mounted on that shaker table. The trigger signal controller is coupled to the camera so as to trigger, while the shaker table is driving the device under test, the capture by the camera of a series of still image frames at a regular sampling frequency that is less than the excitation frequency, thereby under-sampling the vibration. However, the timer that is coupled to the camera records a timestamp of the image capture time for each image frame. When multiple cameras are used, all cameras should be synchronized with a common trigger signal controller for comparable timestamps of related image frames of the different camera views.

Using the timestamps associated with each frame, a processing algorithm running on the computer reorders the stored series of still image frames from each camera into corresponding remapped series of those same images so as to represent a single vibration period. In particular, the earliest captured image frame is used to represent the start of a vibration period and its timestamp serves as the reference time. The known vibration period from the vibration controller is added to the reference time to obtain the end time of one single vibration period. For each captured image frame other than that earliest image frame, the reordering process takes that frame's associated timestamp and shifts its capture backwards in time by a multiple of vibration periods, until an adjusted capture time falls within the vibration period. Once all of the time shifts are completed, the frames are put into a new "remapped" order using the adjusted capture times.

The reordered image sets from the various cameras can be used by available analysis tools to model 3-dimensional movement of the device under test, which can be used to calculate resonant frequency, mode shapes, displacement amounts, and other parameters.

BRIEF DESCRIPTION OF THE DRAWINGS

In FIG. 2B, the under-sampling is not taken into account, resulting in incorrect reconstruction, whereas in FIG. 2C, the under-sampled data is correctly remapped.

DETAILED DESCRIPTION

Figure 1:
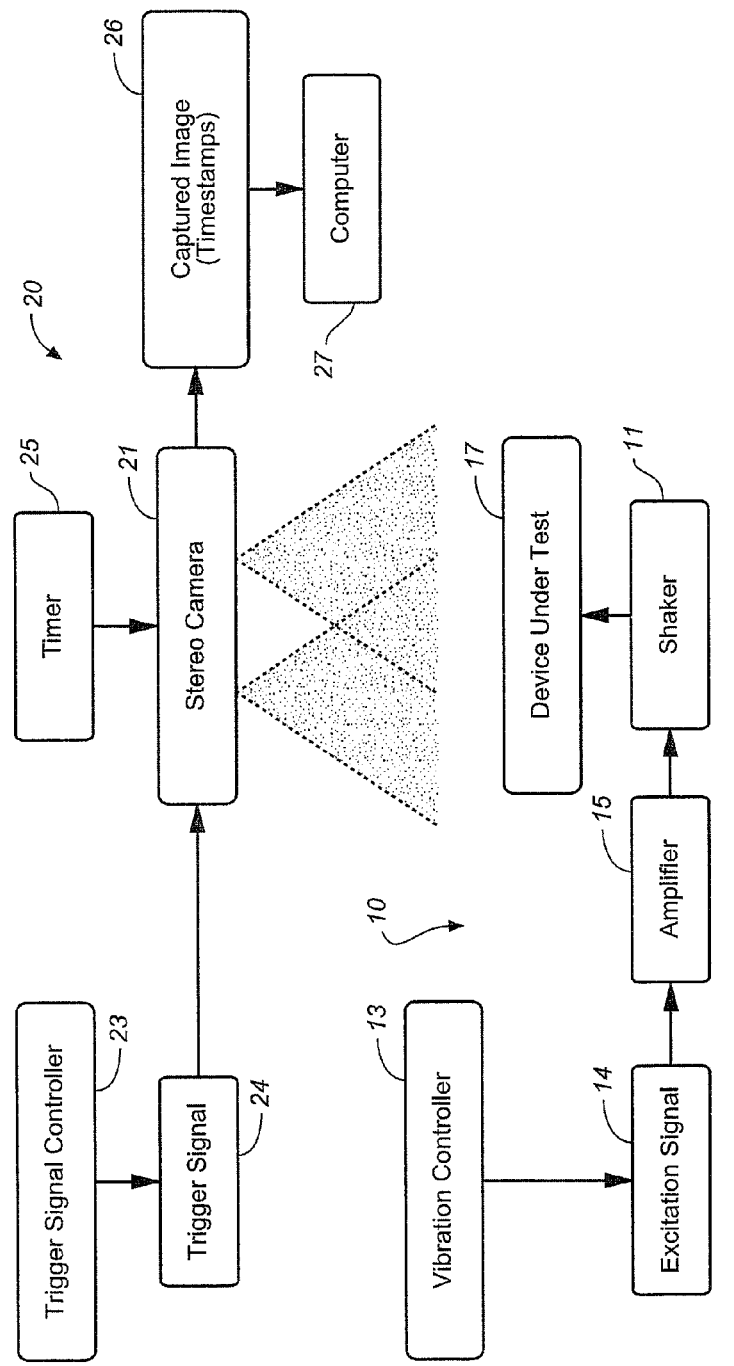
FIG. 1 is a schematic block diagram of a shaker test apparatus in accord with the present invention.

With reference to FIG. 1, a shaker test apparatus includes a set of vibration test equipment 10 (including a shaker 11, a vibration controller 13, and power amplifier 15) for a device under test 17, and a set of image acquisition equipment 20 (including one or more cameras 21 with an associated timer 25, a trigger signal controller 23 and a computer 27). The vibration controller 13 outputs an excitation signal 14 to the amplifier 15 based on a configuration of user-specified parameters, including signal type of Sine, amplitude, frequency, etc. The power amplifier 15 will amplify the excitation signal 14 to drive the shaker 11. The fundamental frequency of the excitation signal 14 from the controller 13 to the shaker 11 can be either fixed, or stepped through multiple fixed frequencies, or slowly swept over a certain frequency range. It is important for subsequent processing of acquired images both that the excitation frequency be known and also that a device under test 17 mounted on the shaker 11 be allowed to obtain a steady-state motion stage. This means the transient responses of the device under test from the initial applying of the excitation frequency will decay and settle. A steady-state motion is normally achieved after probably several vibration cycles at the excitation frequency, so there is a bit of delay before beginning image capture by the camera.

The camera 21, which can preferably be a stereo camera, receives a trigger signal 24 from the trigger signal controller 23. The form of trigger signal 24 from the controller 23 can vary, but the most often used trigger signal is an electrical pulse signal with accurate rising or falling edge. The camera 21 will operate its shutter based on the received trigger signal 24 and as a consequence captures images 26 at either the rising or falling edge of the trigger signal 24. The characteristics of trigger timing from the controller 23 can be set according to user specifications within the capabilities of the camera. In order to permit low speed cameras to be used, an under-sampling technique is used wherein the trigger rate can be at a mere fraction of the shaker's excitation frequency. For definitional purposes, high-speed vibration is any frequency in excess of 200 Hz, and likewise, high-speed imaging is any image capture rate in excess of 500 Hz. Low-speed cameras operate below that limit, typically 30 or 60 frames/sec, and in case of the present invention can be applied to the imaging of devices under test being driven at any frequency, high or low. In any case, very-high-speed vibration over about 1 KHz tends to produce very limited displacements (under 0.2 mm) in the device under test which are difficult to image with any camera.

Figure 2A:
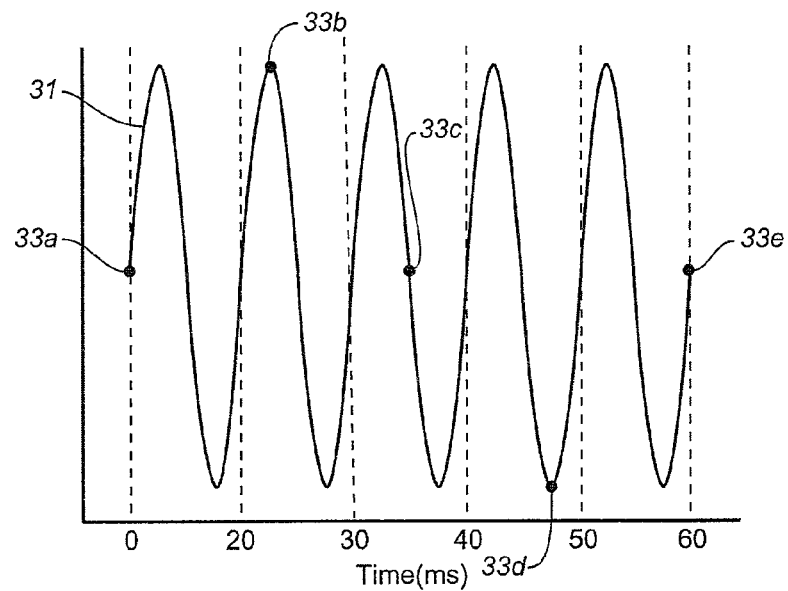
FIGS. 2A to 2C are graphs of vibration displacement versus time that illustrate the reconstruction of an original signal from under-sampled data.
Figure 2B:
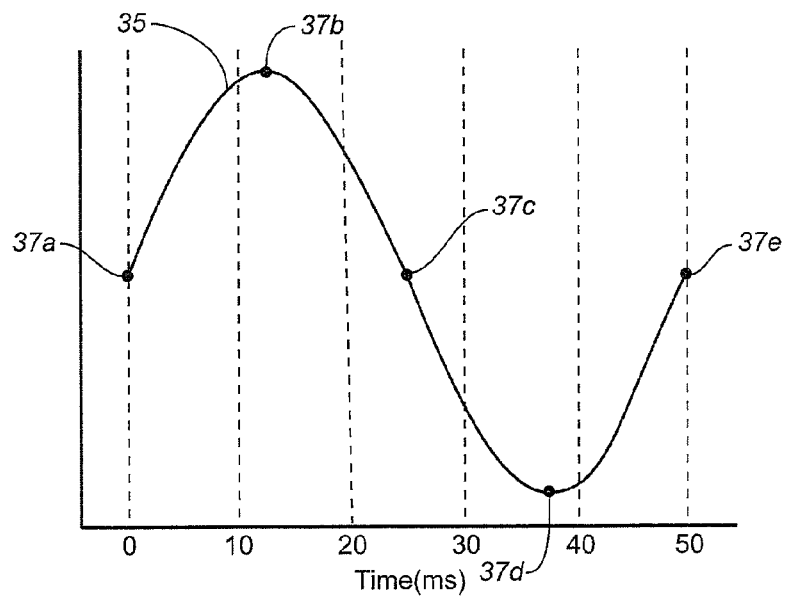
Figure 2C:
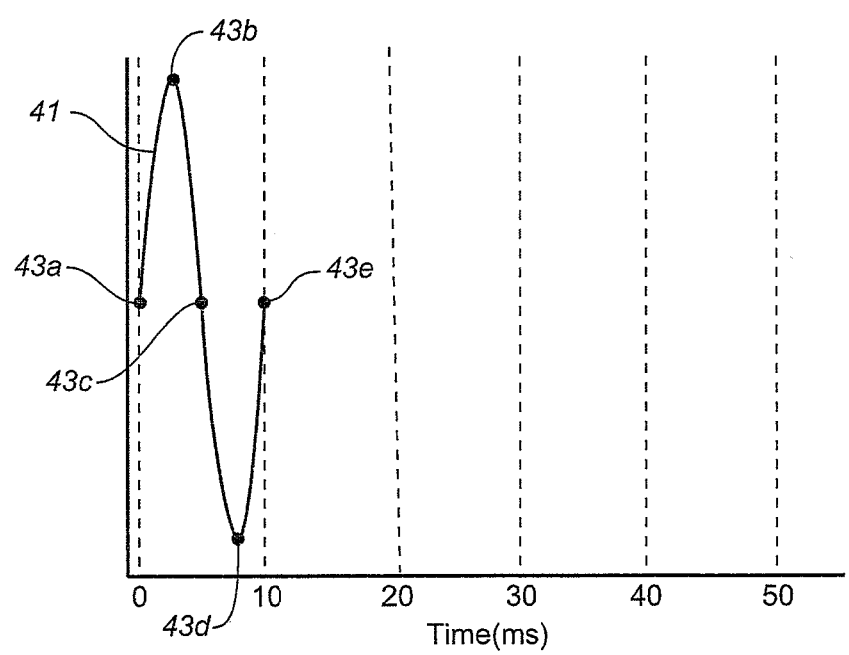

Under-sampling refers to any image capture rate of the camera 21 that is less than twice the vibration frequency of the shaker 11. Nyquist-Shannon sampling theorem normally dictates a sample rate for any data acquisition that is at least twice the observed frequency. However, if a signal being analyzed has a limited bandwidth which is exactly known, then it becomes possible to sample at a lower frequency, i.e. to under-sample the signal, and remap those sample results so as to reconstruct the original signal. To illustrate this, we refer to an example given in FIGS. 2A-2C wherein an original signal 31 is a sine-wave with a known frequency of 100 Hz. If the signal is sampled at a frequency below 200 Hz, say 80 Hz, there will be a set of sample results, marked by the black dots 33a-33e (at every 12½ milliseconds in this example). Normally, if one were not to take into account the under-sampling, the signal reconstruction will result in aliasing, as shown in FIG. 2B, where the reconstructed signal 35 with corresponding sample points 37a-37e every 12½ milliseconds is incorrect. Instead of recreating the original 100 Hz sine-wave, a 50 Hz sine-wave is constructed. However, with knowledge of the signal frequency and the under-sampling rate, it is possible to remap the time of sample results into time-adjusted sample points 43a-43e and thereby correctly reconstruct the signal 41, as seen in FIG. 2C.

This illustration of the theory underlying an under-sampling technique assumes so far that there is no jitter (random fluctuation) in the sample acquisition times. The existence of any such jitter will, unless accounted for, result in errors in remapping the sample points and thus reduced accuracy in the reconstructed signal. Successful application of under-sampling requires high accuracy of the trigger signal controller 23. In particular, the time resolution of the trigger signal controller 23 should be at least higher than the frequency range of the excitation signal 14 driving the shaker 11. For example, if the excitation signal 14 to the shaker 11 is in the range of 1 KHz (1 ms period), the time accuracy of the camera shutter's trigger signal 24 should be in a few microsecond range or better. Even so, time deviations between the signal 24 from trigger signal controller 23 and the capture of the image 26 by camera 21 will decrease the accuracy of signal reconstruction.

Accordingly, the present invention introduces the use of time-stamping to eliminate the influence of jitter. The exact capture time for each image frame 26 is recorded so that even if there is jitter, it can be correctly accounted for in the reconstruction process. Timestamps can be generated from a system clock in the computer 27 receiving the images 26, or more preferably by an interface card timer 25 associated with the camera 21. It is recommended for time-stamping of each image frame to take the interface card timer at the time that the camera shutter is closed, for best accuracy, and to embed that capture time in the image file.

Figure 3A:
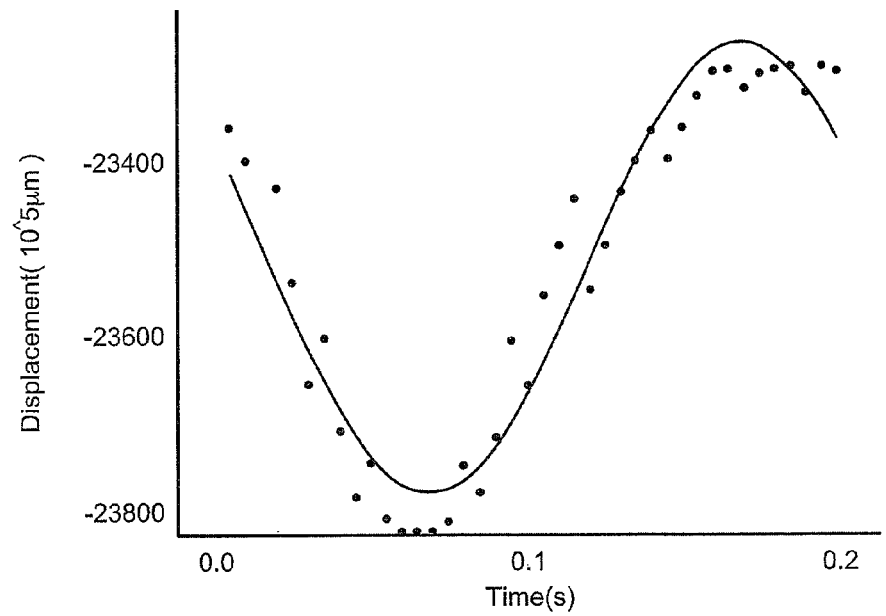
FIGS. 3A and 3B are graphs of reconstructed vibration displacement, first without and then with the use of timestamps, thereby illustrating the benefit of timestamps for accurate reconstruction.
Figure 3B:
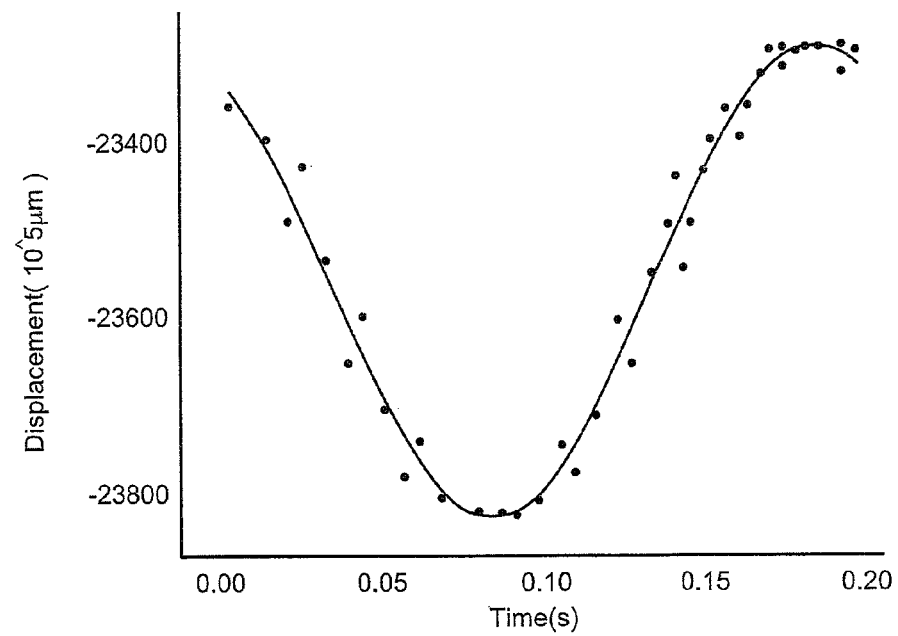

Since jitter within a interface card timer 25 is less than 500 ns (typically 120 ns peak-to-peak jitter and 40 ns repeat jitter), the generated timestamp when using such a timer has a higher timing resolution than most high-timing trigger signal controllers 23, and therefore provided better results when performing under-sampling. As seen in FIG. 3A, for a shaker table operating at 5 Hz and a stereo camera triggered at 1.242 Hz, the under-sampling without the timestamp technology will have an adj. R-square value of 0.92498 when fitting the acquired data to a 5 Hz sinewave. But it can be seen in FIG. 3B, that under the same conditions while using the timestamps, the fitted data will have a much better adj. R-square value of 0.97737.

Capture of timestamped images 26 by the camera or cameras 21 generates a set of image frames which are stored by the computer 27. Using the timestamps associated with each frame, the processing algorithm running on computer 27 reorders the stored series of still image frames for each camera into a corresponding remapped series of those same images so as to represent a single vibration period. In particular, the earliest captured image frame is used to represent the start of a vibration period and its timestamp serves as the reference time. The known vibration period from the vibration controller is added to the reference time to obtain the end time of one single shake period. For each captured image frame other than that earliest image frame, the reordering process takes that frame's associated timestamp and shifts its capture backwards in time by a multiple of one or more shake periods (basically modular arithmetic by means e.g. of successive subtractions from the time-stamped image capture time), until an adjusted capture time falls within the shake period. Thus, for example, if the known shake frequency is 100 Hz, for a shake period of 10 ms, then 10 ms will be subtracted one or more times from the frame's capture time to obtain an adjusted timestamp value that is within 10 ms of the first frame's timestamp. Once all of the time shifts are completed, the frames are put into a new "remapped" order using the adjusted capture times.

Other image sets from additional cameras with different points of view are similarly treated. Preferably, the shutters of all cameras are controlled and synchronized by one and the same timer source so that timestamps for the multiple image sets will be comparable for easier modeling of the 3-dimensional movement of the device under test by known analytical software tools.

Having been put into a remapped order, the image sets can then be played as a moving picture or analyzed to determine degree of displacement and other parameters of the device under test. For example, the reordered image sets from each camera can be used to create model of 3-dimensional movement of the device under test by means of presently available analytical software tools, from which information such as resonant frequency or mode shape can be then be calculated.

What is claimed is:

1. A method of collecting and processing images of a device under test on a shaker table and generating a model of 3-dimensional movement of the device under test, comprising:
   driving a shaker table with sinusoidal signal at a known exciting frequency, a device under test mounted to the shaker table obtaining a steady-state vibration characteristic corresponding to the excitation frequency;
   imaging the device under test, while the shaker table is driving the device under test, as a series of still image frames taken by more than one camera at a regular sampling frequency that is less than the shaker excitation frequency, each image frame being stored together with a timestamp recording an image capture time for that frame;
   reordering the stored series of still image frames from each camera, using the timestamps, into corresponding remapped series of images of each camera that represent a single vibration period beginning with an earliest captured image, where the reordering shifts each image frame, other than the earliest image frame, backwards in time by a specified multiple of vibration periods; and
   creating a model, using the reordered series of images from more than one camera, of 3-dimensional movement of the device under test.

2. The method as in claim 1, wherein an image capture rate of least one camera is not more than 200 Hz.

3. The method as in claim 1, wherein at least one camera is a stereo camera.

4. The method as in claim 1, wherein the timestamps are generated by an interface card timer associated with the camera at the close of the camera's shutter.

5. The method as in claim 1, wherein the timestamps are generated by a system clock of a computer receiving and storing the image frames.

6. The method as in claim 1, wherein the shaker table is driven at a series of stepped vibration frequencies, each frequency step lasting for a specified number of vibration cycles sufficient to capture a set of at least two dozen image frames.

7. The method as in claim 1, further comprising calculating a resonant frequency of the device under test from the 3-dimensional movement modeled by the images.

8. The method as in claim 1, further comprising calculating a mode shape of the device under test from the 3-dimensional movement modeled by the images.

9. The method as in claim 1, wherein the shutters of all cameras are controlled and synchronized by one timer source.

10. The method as in claim 1, wherein multiple shakers are employed to drive the device under test at the same time at same excitation frequency.

11. A shaker test apparatus, comprising:
   a shaker table;
   a vibration controller connected to the shaker table so as to drive the shaker table at a known frequency and period, wherein a device under test obtains a steady-state shake characteristic of that excitation frequency when mounted on the shaker table;
   more than one camera directed toward the shaker table with any device under test mounted on that shaker table;
   a trigger signal controller coupled to the camera so as to trigger the camera, while the shaker table is driving the device under test, to capture a series of still image frames at a regulated sampling frequency that is less than the shaking frequency;
   a timer coupled to the camera(s) so as to record a timestamp of an image capture time for each image frame; and
   a computer processing algorithm for reordering the stored series of still image frames, using the timestamps, into a remapped series of the images representing a single vibration period beginning with an earliest captured image, where the reordering shifts each image frame, other than the earliest image frame, backwards in time by a specified multiple of shake periods.

* * * * *